United States Patent [19]

Maeda

[11] Patent Number: 4,805,992
[45] Date of Patent: Feb. 21, 1989

[54] ASTIGMATISM GENERATOR

[75] Inventor: Takanori Maeda, Saitama, Japan

[73] Assignee: Pioneer Electronic Corporation, Tokyo, Japan

[21] Appl. No.: 103,158

[22] Filed: Oct. 1, 1987

[30] Foreign Application Priority Data

Oct. 1, 1986 [JP] Japan .......................... 61-151736[U]

[51] Int. Cl.$^4$ .................. G02B 5/04; G02B 27/10; G11B 7/135
[52] U.S. Cl. .................... 350/286; 350/173; 350/171; 350/399; 369/112; 369/45; 250/204
[58] Field of Search ................. 350/169–173, 350/286, 399; 369/112, 106, 45; 250/201, 204; 356/123

[56] References Cited

U.S. PATENT DOCUMENTS

| | | | |
|---|---|---|---|
| 4,287,413 | 9/1981 | Kanamura | 369/112 |
| 4,290,132 | 9/1981 | Kotaka | 369/112 |
| 4,358,260 | 11/1982 | Heemskerk et al. | 350/172 |
| 4,724,533 | 2/1988 | Ohara et al. | 369/45 |
| 4,731,527 | 3/1988 | Nomura et al. | 369/45 |

Primary Examiner—Jon W. Henry
Attorney, Agent, or Firm—Sughrue, Mion, Zinn, Macpeak and Seas

[57] ABSTRACT

An astigmatism generator such as may be used in the pickup of an optical disk player which produces substantially no other aberrations yet which can be manufactured at a low cost. The astigmatism generator is fabricated from a plate having four plane surfaces, including a first surface through which light is introduced, a second surface parallel to the first surface and through which the light exits, and a third surface by which light transmitted through the first surface is reflected toward the second surface. The third surface is arranged at an oblique angle to the first and second surfaces and is selected such that almost all coma is eliminated from the light passing through the second surface.

6 Claims, 3 Drawing Sheets

ASTIGMATISM GENERATOR

BACKGROUND OF THE INVENTION

The present invention relates to an astigmatism generator appropriate for use in the pickup of an optical video disk player, a compact disk player, or for the like.

In an optical video disk player or the like, a focusing servo unit is provided in order to maintain an objective lens or the entire pickup at a prescribed distance, namely, at the focused position of the lens. Various systems have been proposed for generating a focusing error signal for operating the focusing servo. One such system is a so-called astigmatism system in which an astigmatism generator is disposed in the optical path of the lens. A typical astigmatism generator is a cylindrical lens 1 shown in FIG. 1. Since the cylindrical lens 1 generates only astigmatism and no other abberations, an accurate focusing error signal can be produced. However, since the surface of the lens needs to be cylindrically processed, the use of such a lens has the disadvantage that the manufacturing thereof is troublesome and expensive. Moreover, the cylindrical lens requires precise adjustment to make the center of the lens coincident with the optical axis.

In contrast with the cylindrical lens 1, mass production of a plane parallel plate shown in FIG. 2, which is an example of another astigmatism generator, is quite easy because the plate can be merely cut out of a plate of glass or the like which has plane parallel surfaces, making its cost very low. However, since the plane parallel plate 2 generates not only astigmatism but also comatic aberration, the distribution of light energy has a tendency to change from circular to triangular or the like so that the symmetry of the distribution is broken. This case is illustrated in FIG. 4. For this reason, it is difficult to produce an accurate focusing error signal when using a plane parallel plate.

Further, the use of a wedge-shaped plane plate 3, as shown in FIG. 3 has also been proposed to generate astigmatism. When the vertex angle $\beta$ of the wedge-shaped plane plate 3 is set at a prescribed value $\beta_0$, coma can be eliminated. Since astigmatism is eliminated at another prescribed value $\beta_1$ smaller than the former $\beta_0$, a prescribed quantity of astigmatism can be generated by setting the vertex angle $\beta$ at the value $\beta_0$, as shown in FIG. 5.

However, since it is necessary not only for the angle $\beta$ between two plane surfaces of the wedge-shaped plane plate 3 to be set to the prescribed value $\beta_0$ but also for the distance (thickness t) between the two plane surfaces to be made precisely the same for all the wedge-shaped plane plates, there is a problem that mass production of an astigmatism generator in the form of a wedge-shaped plate is expensive.

SUMMARY OF THE INVENTION

According to the present invention, a plane parallel plate is provided with a surface extending along the thickness of the plate and obliquely at a prescribed angle to the plane parallel surfaces of the plate.

That is, in more detail, an astigmatism generator provided in accordance with the present invention comprises a first plane surface through which light is introduced to the astigmatism generator, a second plane surface parallel to the first plane surface and through which light transmitted from the first plane surface exits the astigmatism generator, and a third plane surface by which the light transmitted through the first plane surface is reflected toward the second plane surface and which is oblique to the first and the second plane surfaces so as to eliminate almost all comatic aberration from the light exiting the astigmatism generator through the second plane surface.

The first and the second plane surfaces of the astigmatism generator provided in accordance with the present device are parallel to each other, and the third plane surface thereof is arranged obliquely at a prescribed angle to the first and the second plane surfaces so as to eliminate almost all comatic aberration. The light is introduced into the astigmatism generator through the first plane surface, reflected by the third plane surface, and exits the astigmatism generator through the second plane surface.

DESCRIPTION OF THE PREFERRED EMBODIMENTS

Figure 6:
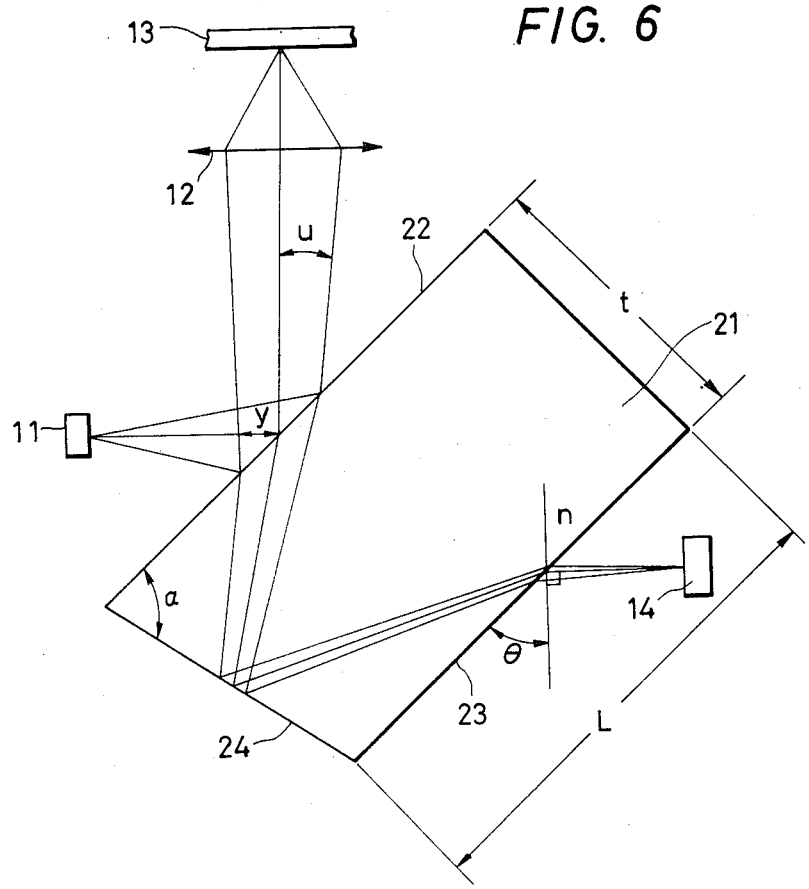
FIG. 6 shows a schematic view of an astigmatism generator constructed according to the present device employed in an optical pickup.

FIG. 6 shows schematically a preferred embodiment of the present invention, which is an astigmatism generator applied to a pickup. Shown respectively at 11, 12, 13 and 14 in FIG. 6 are a light source such as a semiconductor laser, an objective lens, a disk, and a light detecting element. The astigmatism generator is a plane parallel plate 21 made of glass, plastic or the like having plane surfaces 22, 23 and 24. The plane surface 22 is a half mirror. A light from a light source (described hereinafter) is reflected and a reflected light from the disk passes through the plane surface 22.

Divergent light emitted by the light source 11 is reflected by the plane surface 22 and thence introduced to the objective lens 12, which converges the light to irradiate it upon the disk 13. The divergent light reflected by the disk 13 is converged by the objective lens 12 and introduced into the plane parallel plate 21 through the plane surface 22. The light introduced into the plate 21 through the plane surface 22 is transmitted to the plane surface 24 and reflected thereby. The light reflected by the plane surface 24 is transmitted to the light detecting element 14 through the plane surface 23.

Figure 7A:
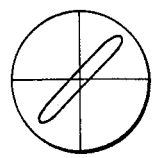
FIG. 7 is an explanatory view of the light detecting element of the optical pickup.
Figure 7B:
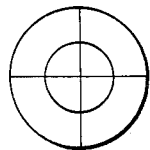
Figure 7C:
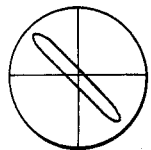
Figure 8:
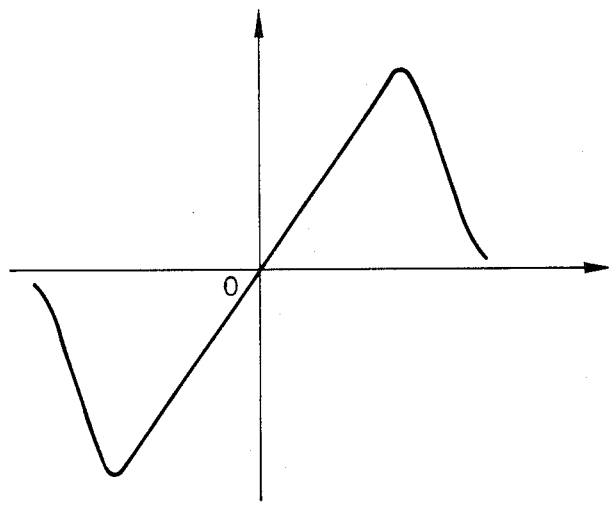
FIG. 8 is a characteristic diagram of a focusing error signal produced using the inventive astigmatism generator.

The light reflected by the disk 13 and transmitted to the light detecting element 14 is astigmatized by the plane parallel plate 21 so that the form of the spot of the light on the light detecting element is nearly circular, as shown in FIG. 7B, when the light spot falling on the detector is in focus. The spot becomes nearly elliptic, as shown in FIGS. 7A and 7C, if the element is removed from the focused position. The light detecting element 14 is divided into four quadrants, for example, as shown in FIGS. 7A to 7C. The difference between the sum of the outputs of the two regions on one diagonal line and that of the outputs of the other two regions on the other diagonal line is calculated to produce a focusing error signal, as shown in FIG. 8.

The plane surfaces 22 and 23 are parallel to each other, while the plane surface 24 is oblique at a prescribed angle $\alpha$ to the plane surfaces 22 and 23. The angle $\alpha$ is set as $\alpha = 90° - (\beta_0/2)$ so as to eliminate the comatic aberration, where $\beta_0$ is a vertex angle of a corresponding wedge-shaped plate, i.e. as the compliment of half the vertex angle. Since the change in the angle of each reflecting plane surface results in a double change in the angle of the reflected light, the light introduced into the plane parallel plate 21 through the plane surface 22, reflected by the plane surface 24, and transmitted to the plane surface 23, undergoes the same effect as light transmitted through a wedge-shaped plane plate having a vertex angle $\beta_0$. Hence, comatic aberration is almost entirely eliminated and only astigmatism is generated by the plane parallel plate.

The angle $\alpha$ can also be determined by calculating the form of the wave surface of the light on the light detecting element 14 For example, the angle $\alpha$ is 88.3° when the angle u of convergence of the light transmitted to the plane surface 22, the radius y of the flux of the light at the point of incidence thereof to the plane surface 22, the angle $\theta$ of the plane surface 23 to the optical axis of the light exiting the plane parallel plate 21 through the plane surface 23, and the refractive index n of the plate 21 are 5.7°, 0.9 mm, 45° and 1.5, respectively.

Figure 1:
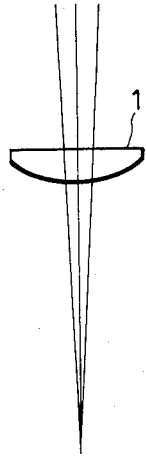
FIGS. 1, 2 and 3 are explanatory views of respective conventional astigmatism generators.
Figure 3:
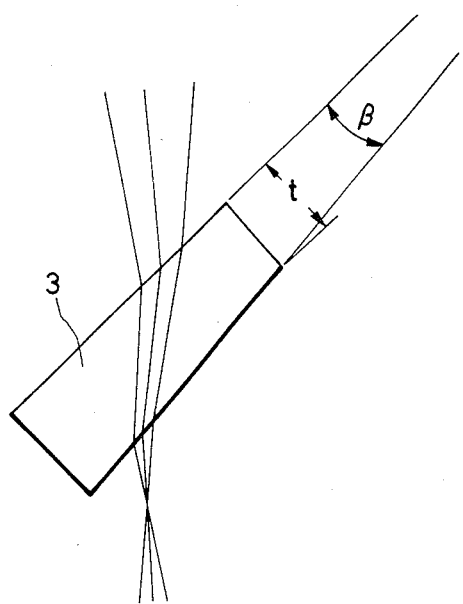
Figure 2:
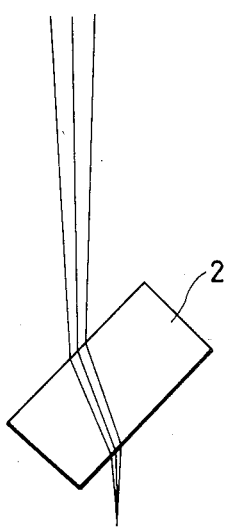
Figure 4:
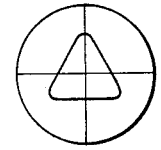
FIG. 4 is an explanatory view of a spot of light received through the conventional astigmatism generator shown in FIG. 2.
Figure 5:
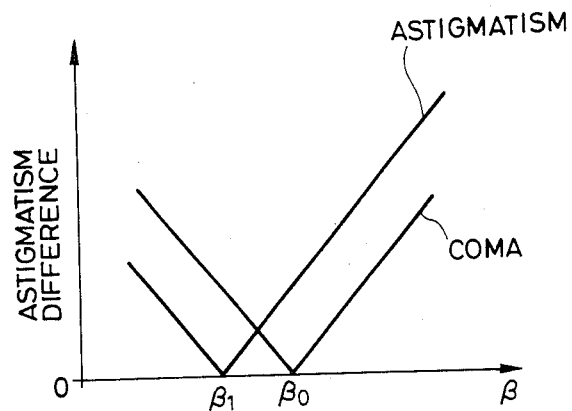
FIG. 5 shows characteristic diagrams of comatic aberration and astigmatism produced by the conventional astigmatism generator shown in FIG. 3.

For example, the plane parallel plate 21 can be manufactured by cutting a plane parallel plate of a prescribed thickness so as to form a reflecting surface at a prescribed angle and then polishing the plate. As opposed to the plate shown in the conventional embodiment of FIG. 3, the thickness t of the plate is uniform. Even if the length L of the plate 21 slightly differs from a designated value, the light transmitted through the plate is not adversely affected. For that reason, it is not necessary to employ precise control over the length of the plate during the manufacture thereof.

Although the plane surface 22 is a half-silvered mirror surface in the above-described embodiment, the present invention is not limited thereto, but may be otherwise embodied by the use of a polarizing film on the plane surface which acts as a beam splitter.

Although astigmatism is generated in the above-described embodiment for the purpose of producing a focusing error signal, the present device is not limited to such uses and may be otherwise employed to correct astigmatism of a semiconductor laser or widen the flux of light in one direction in a laser beam printer or the like.

According to the present invention, an astigmatism generator is provided having a first plane surface through which light is introduced into the astigmatism generator, a second plane surface which is parallel with the first plane surface and through which the light transmitted from the first plane surface exits the astigmatism generator, and a third plane surface by which light transmitted through the first plane surface is reflected toward the second plane surface and which is obliquely arranged with respect to the first and the second plane surfaces so as to eliminate almost all comatic aberration of the light exiting the astigmatism generator through the second plane surface. Mass production of such an astigmatism generator is easy, making the cost low.

What is claimed is:

1. An astigmatism generator comprising a plate of a transparent material having a first plane surface through which light is introduced to said generator; a second plane surface parallel to said first plane surface and through which light transmitted from said first plane surface exits said generator; and a third plane surface by which light transmitted through said first plane surface is reflected toward said second plane surface and which is arranged at an oblique angle to said first and second plane surfaces selected so as to substantially eliminate comatic aberration of the light exiting said generator through said second plane surface.

2. The astigmatism generator of claim 1, further comprising a half-silvered coating provided on said first plane surface.

3. The astigmatism generator of claim 1, further comprising a polarizing film provided on said first plane surface.

4. An optical pickup for a disk player comprising: a light source; a light detector; and an astigmatism generator for reflecting light from said light source to a surface of a disk being played and for directing light reflected from said surface of said disk while astigmatizing the light incident upon said light detector, said astigmatism generator comprising a plate of a transparent material having a first plane surface through which light is introduced to said generator from said light source and said surface of said disk, a second plane surface parallel to said first plane surface and through which light transmitted from said first plane surface exits said generator in the direction of said light detector, and a third plane surface by which light transmitted through said first plane surface is reflected toward said second plane surface and which is arranged at an oblique angle to said first and second plane surfaces selected so as to substantially eliminate comatic aberration of the light exiting said generator through said second plane surface.

5. The optical pickup of claim 4, further comprising a half-silvered coating provided on said first plane surface.

6. The optical pickup of claim 4, further comprising a polarizing film provided on said first plane surface.

* * * * *